United States Patent
Chronister et al.

[11] Patent Number: 5,819,791
[45] Date of Patent: Oct. 13, 1998

[54] CHECK VALVE INCLUDING MEANS TO PERMIT SELECTIVE BACK FLOW

[75] Inventors: James N. Chronister; James D. Phillips, both of Houston; Richard C. Gasaway, Pearland; Ricky E. Pineda, Alvin, all of Tex.

[73] Assignee: Gulf Valve Company, Houston, Tex.

[21] Appl. No.: 964,287

[22] Filed: Nov. 4, 1997

[51] Int. Cl.$^6$ .................................................. F16K 15/00
[52] U.S. Cl. ...................... 137/512.1; 137/523; 251/81; 251/83; 251/104
[58] Field of Search ................. 137/512.1, 523, 137/522, 383; 251/82, 83, 103, 104

[56] References Cited

U.S. PATENT DOCUMENTS

| | | |
|---|---|---|
| Re. 32,409 | 4/1987 | Holtgraver . |
| 1,013,695 | 1/1912 | Storer et al. ............................. 137/522 |
| 1,200,842 | 10/1916 | Johnson .................................. 137/522 |
| 1,308,638 | 7/1919 | Metzger .................................. 137/383 |
| 1,743,350 | 1/1930 | Hopkins .................................. 137/383 |
| 1,795,839 | 3/1931 | Credle .................................... 137/383 |
| 1,949,926 | 3/1934 | Causey .................................... 137/383 |
| 3,290,001 | 12/1966 | Taylor . |
| 3,384,112 | 5/1968 | Smith . |
| 3,448,762 | 6/1969 | Schmitt .................................. 137/383 |
| 3,533,438 | 10/1970 | Smith . |
| 4,480,660 | 11/1984 | Bayart et al. ........................... 137/522 |
| 4,658,857 | 4/1987 | Ayres, Jr. . |
| 4,728,010 | 3/1988 | Johnston ................................ 137/522 |
| 4,809,948 | 3/1989 | Gardner et al. . |
| 5,014,528 | 5/1991 | Roberts .................................. 251/104 |
| 5,029,808 | 7/1991 | McCauley . |
| 5,301,709 | 4/1994 | Gasaway ................................ 137/512.1 |
| 5,699,829 | 12/1997 | Weiler, Jr. et al. ..................... 137/383 |

Primary Examiner—Denise L. Ferensic
Assistant Examiner—Joanne Y. Kim
Attorney, Agent, or Firm—Bush, Riddle & Jackson

[57] ABSTRACT

A preferred embodiment of FIGS. 1–3 includes a check valve (10) with a pair of semicircular check valve members (34, 36) normally permitting fluid flow in one direction and blocking fluid flow in an opposite direction. Semicircular valve member (36) is releasably locked in an open position to permit a back flow upon manual rotation of handle (46) after manual gripping of knurled knob (84) and withdrawal of a locking pin (82) from a receiving opening (96). A safety lever (98) is pivoted out of a covering relation to knob (84) before knob (84) is gripped and prevents rotation of shaft (38) unless lever (98) is manually pivoted out of covering relation with knob (84). Another embodiment shown in FIG. 4 permits selective opening of a semicircular plate valve member (34A or 36A) to a releasably locked open position. Manual rotation of handle (46A) in one direction effects movement of semicircular valve member (36A) to an open position. Separate manual movement of handle (46B) in an opposite direction effects rotation of plate valve member (34A) to an open position. Another embodiment shown in FIGS. 5 and 6 provides a planetary gear arrangement which is effective to rotate the check valve members simultaneously to an open position. Rotation of handle (46C) effects rotation of shaft (38C) in one direction for opening of one of the semicircular valve members and rotation of sleeve or shaft (42C) in an opposite direction effects rotation of the other check valve member to an open position.

18 Claims, 4 Drawing Sheets

CHECK VALVE INCLUDING MEANS TO PERMIT SELECTIVE BACK FLOW

FIELD OF THE INVENTION

This invention relates to a check valve, and more particularly to a check valve which includes means to permit, selectively, a back flow of fluid through the check valve.

BACKGROUND OF THE INVENTION

Check valves, such as shown in U.S. Pat. No. 5,301,709 dated Apr. 12, 1994, normally permit fluid flow in one direction and block fluid flow in an opposite direction. At times, it may be desirable to permit, selectively, a back flow of fluid in an opposite direction. For example, it may be desirable to provide a back wash of the fluid system in pipelines or the like as foreign matter or product tends to adhere to the inner surfaces of the pipe upon prolonged use thereof, particularly in certain services, such as the transport of crude oil. For cleaning the pipe, a cleaning fluid is normally employed and is conveyed through the pipe in a direction opposite the normal flow of product through the pipe. Thus, in the event check valves are mounted in the pipe or transport line, it is necessary to maintain the check valve at least in a partially open position during cleaning of the line.

U.S. Pat. No. 4,658,857 dated Apr. 21, 1987 is directed to a check valve having a pair of semicircular plates and a manually actuated handle and associated lock lever to control the position of the semicircular plates. No provision is made for any safety device to prevent or minimize inadvertent movement of the semicircular plates.

SUMMARY OF THE INVENTION

The present invention is particularly directed to a check valve having a plate valve member pivotally mounted within a valve body with a manually actuated handle operatively connected to the plate valve member for selective manual movement of the plate valve member to an open releasably locked position to permit a back fluid flow in an opposite direction from normal fluid flow. A handle is mounted on an upper mounting plate secured to an actuating shaft for rotation of the plate valve member. The upper mounting plate also carries a manually operated locking pin or detent for releasably locking the shaft.

It is important that the check valve not be inadvertently moved to a back flow position. A pivoted cover over the locking pin prevents manual retraction of the locking pin unless the cover is manually pivoted from a covering relation thereby preventing accidental or inadvertent movement of the check valve member to a back flow position. The cover may be positively locked in a covered position of the pin to require removal of a lock before actuation. For movement of the plate valve member to a back flow position, the cover is manually pivoted away from a covering relation with the locking pin to expose the locking pin. Then, the locking pin is manually retracted from a receiving opening in an adapter on the valve body and rotated to hold the pin in a retracted position. Next, the handle is gripped and rotated 90 degrees for rotation of the check valve member. The locking pin is then manually rotated for release of the pin for inward movement into a locking position with the end of the pin received within an aligned opening. In this position, the check valve plate member is releasably locked in an open position for fluid back flow. To move the check valve member back to its normal position after backwashing of the associated flow line, the procedure as set forth above is reversed.

Other features and advantages of the invention will be apparent from the following specification and drawings.

DESCRIPTION OF THE INVENTION

Figure 1:
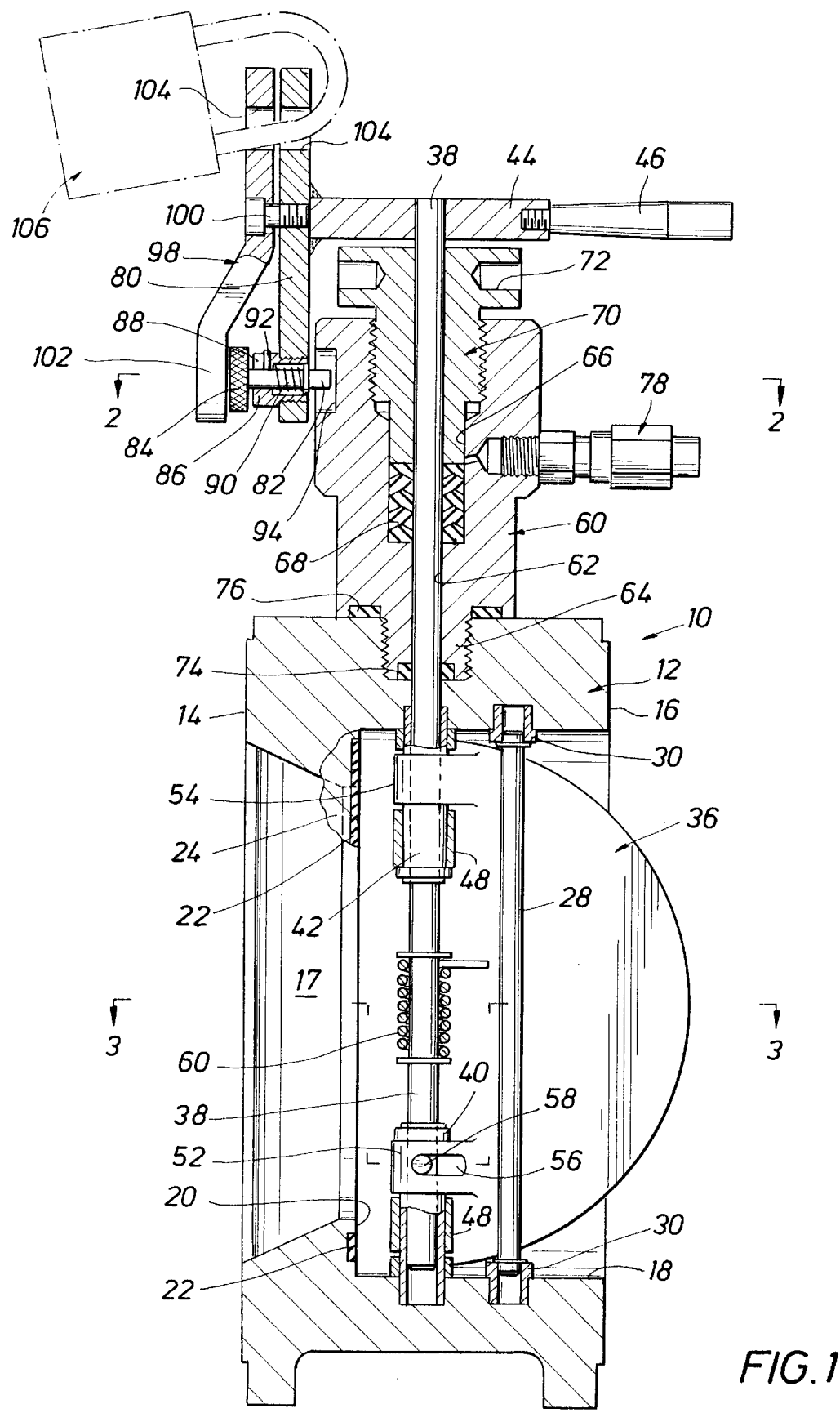
FIG. 1 is a sectional view of one embodiment of the present invention in which a check valve comprises a pair of semicircular plate valve members with one of the semicircular plate valve members releasably locked in an open position for fluid back flow.
Figure 2:
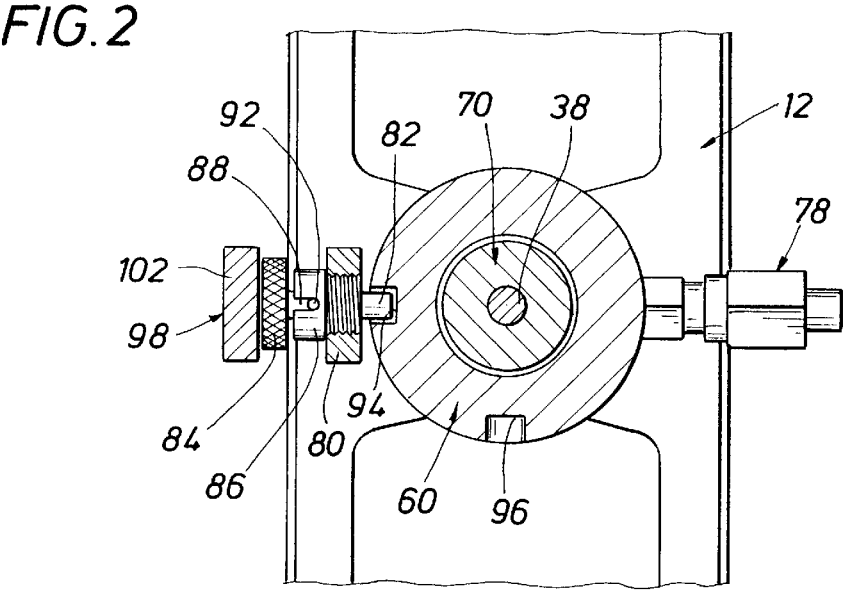
FIG. 2 is a sectional view taken generally along the line 2—2 of FIG. 1.
Figure 3:
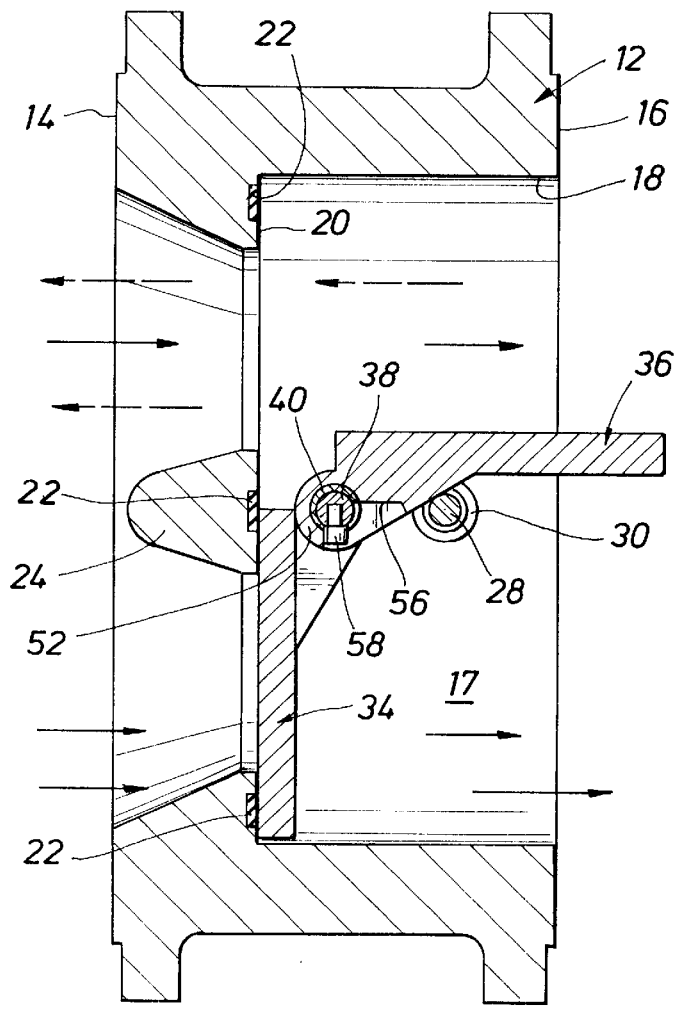
FIG. 3 is a sectional view taken generally along the line 3—3 of FIG. 1.

Embodiment of FIGS. 1–3

Referring now to FIGS. 1–3 in which a preferred embodiment of the invention is illustrated, a check valve is shown generally at 10 having a generally cylindrical integral valve body 12. Valve body 12 has opposed end faces 14 and 16 and a central bore or flow passage 17. Valve body 12 is adapted for mounting in a flow line (not shown) with faces 14 and 16 in abutting contact with opposed end faces of the flow line. Face 14 is on the upstream side and face 16 is on the downstream side of flow line 17. Valve body 12 has an inner peripheral surface 18 defining the central bore or flow passage 17 and an annular shoulder 20 defining a valve seat. Seat 20 has an annular resilient seal 22 mounted within a groove in seat 20. Seat 22 may, if desired, be vulcanized to valve body 12. Also, it may be desirable in some instances to provide a metal-to-metal seal in lieu of the resilient seal, particularly for high temperatures and for particular ladings being transported in the associated flow line. A rib or post 24 of valve body 12 includes an arcuate portion of seal 22 and extends diametrically across flow passage 17 to form a valve support member. A stop pin 28 also extends diametrically across flow passage 17 in spaced parallel position to post 24 for limiting pivotal movement of the check valve. Stop pin 28 has ends received within opposed sleeves 30 mounted on body 12.

A valve subassembly is mounted across flow passage 17 and includes a pair of semicircular plate valve members 34 and 36. A valve shaft 38 is received in lower and upper sleeves 40 and 42 mounted within openings in valve body 12. The upper end of shaft 38 is secured to an outer generally cylindrical plate 44 having a handle 46 extending laterally for manually gripping and selective manual rotation of semicircular valve member 36 to a releasably locked back flow position as will be explained further. Semicircular check valve member 34 has a pair of apertured lugs 48 receiving shaft 38 and sleeves 40, 42.

Semicircular check valve member 36 has lower and upper apertured lugs 52 and 54 receiving shaft 38 and respective sleeves 40, 42. Lower lug 52 has an arcuate slot 56 therein extending for ninety (90) degrees and a pin or detent 58 mounted on shaft 38 is received within slot 56. A torsion spring 60 about shaft 38 continuously urges semicircular valve members 34 and 36 to closed position engaging seals 22. Semicircular valve member 34 is mounted for free rotational movement relative to shaft 38. Valve member 36 is mounted for ninety (90) degrees free rotative movement relative to shaft 38 with lug 52 moving ninety (90) degrees relative to pin 58 between open and closed positions relative to pin 58. Stop pin or rod 28 limits free pivotal movement of valve members 34, 36 to ninety (90) degrees.

FIGS. 1 and 3 show semicircular valve member 36 in a releasably locked open position after manual rotation of shaft 38 permitting a back flow of fluid in flow passage 17 in a direction shown by the arrows in broken lines in FIG. 3 opposite the normal flow shown by the arrows in solid lines in FIG. 3. Valve member 34 remains in closed position blocking fluid flow from the back flow direction.

To permit manual rotation of shaft 38 and movement of semicircular valve member 36 to the position in FIG. 3, an adapter having a body generally indicated at 60 is shown having a small diameter lower bore 62 receiving shaft 38 and an externally threaded small diameter lower body portion 64 threaded within an internally threaded opening in valve body 12. Adapter body 60 has an enlarged diameter upper bore portion 66 receiving a packing 68 and a packing nut 70. Packing nut 70 has a plurality of blind openings 72 therein to receive a suitable tool for rotation of packing nut 70 for compression of packing 68. An annular elastomeric seal 74 seals between shaft 38 and adapter body 60. An annular elastomeric seal 76 seals between adapter body 60 and valve body 12. An emergency seal fitting is shown generally at 78 and a suitable sealant can be inserted within fitting 78 for flow to packing 68 in the event of failure of packing 68.

To prevent inadvertent manual rotation of plate valve member 36, a locking mounting strip or leg 80 is secured to outer plate 44 and carries at its lower end a releasable locking pin 82 having a knurled knob 84 for manual gripping. Pin 82 is mounted on sleeve 86 carried by leg 80. As shown on FIG. 2, a pair of blind openings 94 and 96 ninety (90) degrees apart are provided in adapter body 60 to receive pin 82. Pin 82 is received within opening 96 in the normal operation of check valve 10 and received within opening 94 as shown in FIGS. 1 and 2 when check valve member 36 is manually rotated to a releasably locked open position. A compression spring 90 biased against sleeve 86 continuously urges pin 82 inwardly.

A locking safety lever 98 is pivotally mounted at 100 on mounting leg 80 and has a lower end portion 102 in normal covering relation to knurled knob 84. Lower end portion 102 of safety lever 98 when not manually pivoted out of covering relation to knob 84 moves by gravity about pivot 100 to covering relation with knurled knob 84. Sleeve 86 has an outwardly extending slot 88 therein as shown in FIGS. 1 and 2. A retaining detent 92 secured to pin 82 is received within slot 88 when pin 82 is received within blind openings 94 and 96. Detent 92 is effective to hold pin 82 out of engagement with openings 94 and 96 upon manually gripping of knob 84 and withdrawing pin 82 from opening 94 or 96. Rotation of pin 82 after detent 92 clears slot 88 permits detent 92 to engage the outer edge of sleeve 86 upon manual release of knob 84 to hold pin 82 out of engagement with openings 94 and 96 and permit rotation of shaft 38 and check valve member 36 upon manual rotation of handle 46. Openings 104 in lever 98 and mounting leg 80 are in axial alignment for receiving a padlock 106 as shown in broken lines in FIG. 1 when pin 82 is received with openings 94 or 96 to permit lever 98 to pivot into covering relation with knob 84. For removal of pin 82 from opening 94 or opening 96, padlock 106 must be removed and lever 98 must then be pivoted manually about pivot 100 out of covering relation with knob 84. Knob 84 is then accessible for manual gripping and withdrawal of pin 82 from opening 94 or 96. Padlock 106, if desired, may be utilized at both the normal operating position and the back flow position of check valve member 36 to prevent inadvertent or accidental manual movement of check valve member 36 to or from the releasably locked open position.

Operation

In operation, with semicircular valve member 36 in normal operation, pin 82 is received within opening 96 and covered by lower end portion 102 of locking lever 98. First, padlock 106 is unlocked and removed from aligned openings 104. Lever 98 is manually pivoted about pivot 100 to remove lower end portion 102 from covering relation with knurled knob 84. Then, knob 84 is gripped and pulled outwardly to remove pin 82 from opening 96 and then rotated so that detent 92 engages the outer edge of sleeve 86. Knob 84 may then be released to hold pin 82 in a retracted position against the outer edge of sleeve 86. Next, handle 46 is gripped and manually rotated ninety (90) degrees in a clockwise direction with detent 92 riding along the outer edge of sleeve 86. As pin 58 is in engagement with lug 52, check valve member 36 is rotated to the position shown in FIGS. 1 and 2 with check valve member 36 engaging stop rod 28 to limit movement of valve member 36. In this position, pin 82 is in axial alignment with opening 94. When pin 82 is aligned with opening 94, knob 84 is manually gripped and rotated to align detent 92 with slot 88. Knob 84 is then released to permit pin 82 to project within opening 94 and detent 92 to be received within slot 88 under the force of spring 90. Locking lever 98 then returns by gravity to covering position with knob 84 and openings 104 are in alignment. Padlock 106 may then be utilized to releasably lock semicircular valve member 36 in the position of FIGS. 1 and 2. In this position, semicircular valve member 36 is positively locked in an open position to permit a back flow of fluid in a reverse direction as shown by the broken line indication of arrows in FIG. 3. Lever 98 when in a covering position to knob 84 provides a positive indication that locking pin 82 is in engagement with either opening 94 or opening 96.

Figure 4:
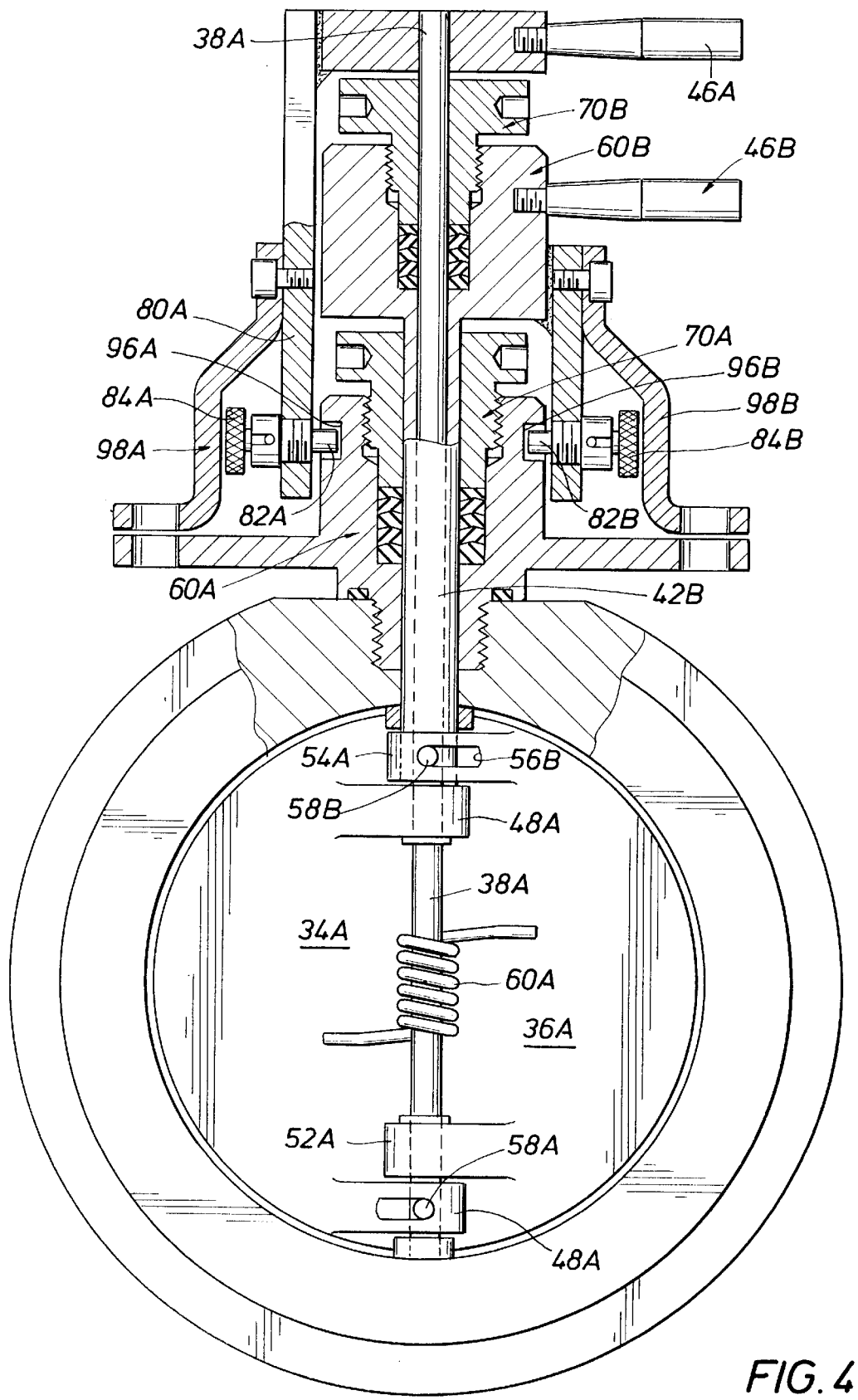
FIG. 4 is a sectional view of another embodiment of the invention in which the check valve comprises a pair of semicircular plate valve members with each semicircular plate valve member separately mounted for rotational movement to an open position by a manually operated handle for each valve member to permit a fluid back flow.

Embodiment of FIG. 4

It may be desirable to have both semicircular valve members in an open position for fluid back flow, and FIG. 4 illustrates an embodiment in which each of the semicircular valve members 34A and 36A may be rotated individually to an open position. For rotative movement of semicircular valve member 34A from a normal operating position as shown in FIG. 4 to an open back flow position, handle 46A and shaft 38A are rotated in a counterclockwise direction with pin 58A on shaft 38A engaging lower lug 48A to rotate semicircular valve member 34A to an open position. Prior to rotation of handle 46A, lever 98A is manually pivoted out of covering relation with knob 84A and knob 84A is then pulled outwardly to withdraw pin 82A from opening 96A to permit rotation of shaft 38A by handle 46A. Mounting leg 80A carries locking pin 82A. Packing nut 70A and adapter 60A are similar to the embodiment of FIGS. 1–3.

To move semicircular plate valve member 36A to an open back flow position, handle 46B is secured to an upper adapter 60B. Upper adapter 60B has an internal sleeve or collar 42B having a lower end portion received within upper lug 54A of valve member 36A. A pin 58B is secured to sleeve 42B and extends within an arcuate slot 56B of lug 54A. Rotation of handle 46B in a clockwise direction rotates sleeve 42B and pin 58B in a clockwise direction to open semicircular valve member 36A. Prior to rotation of handle 46B, locking lever 98B is rotated out of covering relation with knob 84B on pin 82B to permit manual withdrawing of pin 82B from opening 96B to allow rotation of handle 46B and lower sleeve 42B. Rotation of lower sleeve 42B effects rotation of semicircular valve member 36A to an open position by contact of pin 58B secured to sleeve 42B in engagement with lug 54A. A packing nut 70B is received within adapter 60B. Thus, semicircular plate valve members 34A and 36A may be individually moved selectively to an open releasably locked position to permit a fluid back flow.

Figure 5:
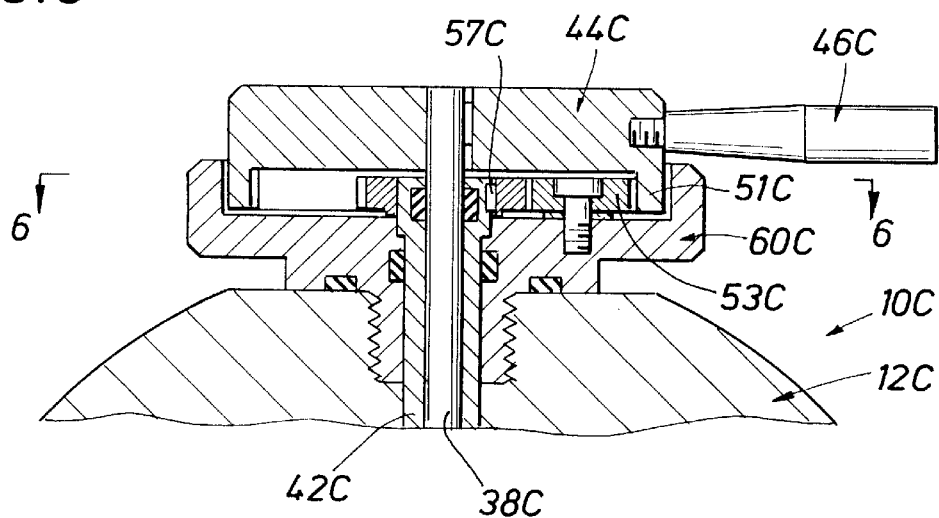
FIG. 5 is a sectional view of a further embodiment of the invention in which an operating mechanism for a pair of semicircular plate valve members are shown which is effective for moving the semicircular valve members simultaneously to an open position upon manual actuation of a single handle.
Figure 6:
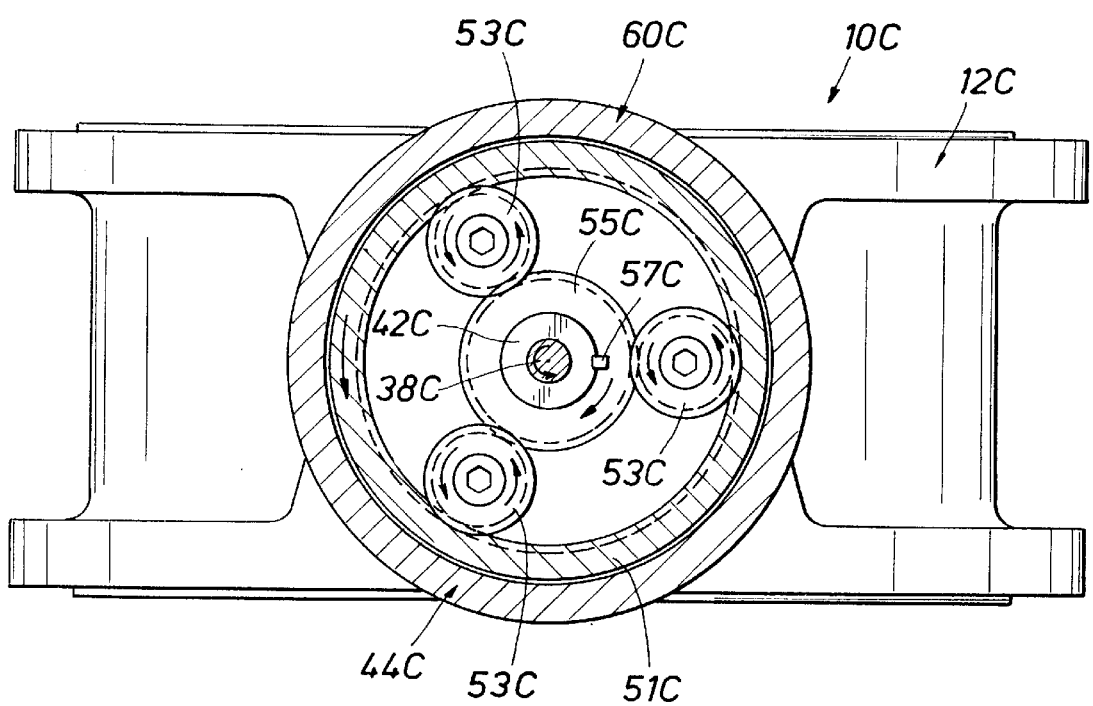
FIG. 6 is a section taken generally along line 6—6 of FIG. 5.

Embodiment of FIGS. 5–6

It may be desirable under some conditions to have the semicircular check valve members moving together and actuated from a single handle. The embodiment shown in FIGS. 5 and 6 show an actuating mechanism for the semicircular check valves including a planetary gear arrangement which is effective to provide simultaneous movement of the semicircular check valve members to a releasably locked open position for fluid back flow. Check valve 10C has a body 12C with semicircular check valve member (not shown) generally similar to check valve member 34A and 36A of the embodiment shown in FIG. 4. An adapter 60C is threaded within body 12C. A shaft 38C is connected to one of the semicircular check valve members and sleeve 42C is connected to the other semicircular check valve member. A handle 46C is secured to an upper plate 44C which has a lower ring gear 51C with internal teeth which engage external teeth on a plurality of planet or planetary gears 53C. A sun gear 55C is driven from planetary gears 53C. Sun gear 55C is keyed at 57C to sleeve 42C. Upon manual movement of handle 46C in a counterclockwise direction, shaft 38C and ring gear 51C are rotated in a counterclockwise direction to pivot one of the semicircular valve members to an open position. Planetary gears 53C and sun gear 55C are effective to rotate sleeve 42C in an opposite clockwise direction for pivoting the other semicircular valve member simultaneously to an open position. Shaft 38C and sleeve 42C rotate at different rotational speeds and a suitable lost motion connection is provided between shaft 38C and sleeve 42C to compensate for the different rotational speeds.

From the above, it is apparent that a check valve has been provided including a plate valve member with manual valve control means operatively connected to the plate valve member for manual pivotal movement of the plate valve member to an open position for releasably locking the plate valve member in open position to permit a back flow of fluid as might be desirable for cleaning a pipe line or the like. While a check valve having a pair of semicircular valve members has been illustrated in the drawings, it is to be understood that other types of check valves utilizing a single pivotally mounted plate valve member, such as a swing check valve member, may be utilized with the present invention.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

We claim:

1. A check valve for normally permitting fluid flow in one direction and for normally blocking fluid flow in an opposite direction; said check valve comprising:

a valve body having a flow passage therethrough;

a plate valve member pivotally mounted within said valve body responsive to fluid pressure from one direction for normal pivotal movement to an open position permitting fluid flow, and responsive to fluid pressure from an opposite direction for normal pivotal movement to a closed position blocking fluid flow;

a shaft operatively connected to said plate valve member;

a manually operated handle connected to said shaft for manual rotation of said plate valve member;

a manually releasable locking member for releasably locking said shaft and plate valve member at a predetermined open position of said plate valve member; and means to restrict manual access to said releasable locking member to prevent inadvertent actuation of said manually releasable locking member.

2. A check valve as set forth in claim 1 wherein said releasable locking member comprises a locking pin and a spring urging the locking pin within a recess in said body for releasably locking said shaft.

3. A check valve as set forth in claim 1 wherein a cover is positioned over said releasable locking member to prevent manual access to said locking member for actuation thereof.

4. A check valve as set forth in claim 3 wherein said cover is mounted for pivotal movement between a normal first position in covering relation to said locking member to prevent access and a second position removed from covering relation to permit access to said locking member.

5. A check valve as set forth in claim 4 wherein a separate locking member is connected to said cover to releasably lock said cover in covering relation to said locking member to prevent access to said first mentioned releasable locking member.

6. A check valve as set forth in claim 1 wherein resilient means continuously forces said plate valve member to a closed position; and said handle moves said plate valve member to an open position against the force of said resilient means.

7. A check valve as set forth in claim 6 wherein said plate valve member is generally semicircular.

8. A check valve as set forth in claim 1 wherein said manually releasable locking member comprises a manually actuated retaining pin received within an aligned opening at the normal operating position of said plate valve member and within another aligned opening positioned at about ninety (90) degrees to said first mentioned aligned opening; and means permit pivotal movement of said plate valve member during normal operation between said open position and said closed position when said pin is in said first mentioned aligned opening.

9. A check valve as set forth in claim 8 wherein said manually actuated retaining pin is movable manually between an inward projected position at the open position for retaining said plate valve member in a locked position, and an outward retracted position to permit manual rotation of said plate valve member.

10. A check valve as set forth in claim 9 wherein a manually actuated safety member is movable manually between a position blocking manual operation of said retaining pin and a position permitting manual operation of said pin, said safety member requiring manual movement of said safety member to said position permitting manual operation before manual actuation of said retaining pin.

11. In a check valve for normally permitting fluid flow in one direction and for normally blocking fluid flow in an opposite direction; said check valve having a valve body having a flow passage therethrough and a pair of semicircular plate valve members pivotally mounted within said valve body responsive to fluid pressure from one direction for normal pivotal movement to an open position permitting fluid flow, and responsive to fluid pressure from an opposite direction for normal pivotal movement to a closed position blocking fluid flow; improved valve operating means comprising:

a shaft operatively connected to at least one plate valve member;

a manually operated handle connected to said shaft for manual rotation of said one plate valve member;

a manually releasable locking member for releasably locking said shaft and said one plate valve member at a predetermined open position of said one plate valve member; and means to block manual access to said releasable locking member to prevent inadvertent actuation of said manually releasable locking member.

12. In a check valve as set forth in claim 11 wherein resilient means continuously forces said plate valve members to a closed position for normal operation; and said handle is effective to move said one plate valve member to said open back flow position against the force of said resilient means.

13. In a check valve as set forth in claim 11 wherein said handle is operatively connected to both of said semicircular plate valve members for manual pivotal movement of said plate valve members to a releasably locked open position to permit fluid flow in said opposite direction through both of said plate valve members.

14. In a check valve as set forth in claim 13 wherein a separate shaft is operatively connected to each of said semicircular plate valve members for movement of said plate valve members to open position.

15. In a check valve as set forth in claim 13 wherein said valve operating means includes a single manually operated shaft; and a gear structure is arranged between said shaft and said semicircular plate valve members for simultaneous movement of said semicircular plate valve members to an open position upon rotation of said manually operated shaft.

16. In a check valve as set forth in claim 11 wherein said valve operating means includes a manually operated pin received within an aligned opening at the normal operating position of said one plate valve member and within another aligned opening positioned at about ninety (90) degrees to said first mentioned aligned opening; and means permit pivotal movement of said one plate valve member during normal operation between said open position and said closed position when said pin in said first mentioned aligned opening.

17. In a check valve as set forth in claim 11 wherein said releasable locking means comprises a manually actuated retaining pin movable manually between an inward projected position at the open position for retaining said one plate valve member in a locked position and an outward retracted position to permit manual rotation of said one plate valve member.

18. A check valve as set forth in claim 17 wherein a manually actuated safety member is movable manually between a position blocking manual operation of said pin and a position permitting manual operation of said pin, said safety member requiring manual movement of said safety member to said position permitting manual operation before manual actuation of said pin.

* * * * *